(12) United States Patent
Liu et al.

(10) Patent No.: US 9,635,619 B2
(45) Date of Patent: Apr. 25, 2017

(54) WIRELESS NETWORK DEVICE AND WIRELESS NETWORK CONTROL METHOD

(71) Applicant: Accton Technology Corporation, Hsinchu (TW)

(72) Inventors: I-Ru Liu, Taipei (TW); Ji-Shang Yu, Hsinchu (TW); Chao-Pin Liu, Taipei (TW); Wen-Pin Lo, Taipei (TW); Hsin-Hsiung Kang, Taipei (TW); Hua-Chung Kung, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 179 days.

(21) Appl. No.: 14/739,706

(22) Filed: Jun. 15, 2015

(65) Prior Publication Data
US 2015/0365955 A1    Dec. 17, 2015

(30) Foreign Application Priority Data
Jun. 16, 2014    (TW) .............. 103120667 A

(51) Int. Cl.
| | | |
|---|---|---|
| *H04L 1/00* | (2006.01) | |
| *H04W 52/16* | (2009.01) | |
| *H04B 1/00* | (2006.01) | |
| *H04W 88/00* | (2009.01) | |
| *H04B 7/0408* | (2017.01) | |
| *H01Q 1/24* | (2006.01) | |
| *H01Q 21/20* | (2006.01) | |
| *H04W 52/42* | (2009.01) | |

(52) U.S. Cl.
CPC ............ *H04W 52/16* (2013.01); *H01Q 1/246* (2013.01); *H01Q 21/205* (2013.01); *H04B 1/00* (2013.01); *H04B 7/0408* (2013.01); *H04W 88/00* (2013.01); *H04W 52/42* (2013.01)

(58) Field of Classification Search
CPC .... H01Q 1/088; H01Q 1/1207; H01Q 1/1221; H01Q 1/1228; H01Q 1/1242; H01Q 1/125; H01Q 1/3258; H01Q 1/3283
USPC .................................. 343/853, 893
See application file for complete search history.

(56) References Cited

U.S. PATENT DOCUMENTS 3,713,315 A *   1/1973   Meyer ..................... B21H 5/02
                                                72/100
5,612,702 A *   3/1997   Kinsey ................ G01S 13/4409
                                                342/149

(Continued)

FOREIGN PATENT DOCUMENTS

| CN | 102569974 A | 7/2012 |
|----|----|----|
| TW | 508867 B | 11/2002 |

(Continued)

*Primary Examiner* — Dady Chery
(74) *Attorney, Agent, or Firm* — Birch, Stewart, Kolasch & Birch, LLP

(57) ABSTRACT

A wireless network device includes an antenna array and a lobe interleaver. The antenna array includes a plurality of antenna elements with different squint angles. The lobe interleaver is coupled to the antenna elements and has a plurality of output lobe ports. The lobe interleaver divides and interleaves the radio signal of the antenna array with the same phase and the same power to generate a plurality of lobes with different squint angles. The number of lobes is twice the number of antenna elements.

16 Claims, 7 Drawing Sheets

(56) References Cited

U.S. PATENT DOCUMENTS

| | | | |
|---|---|---|---|
| 5,812,089 A * | 9/1998 | Locke | H01Q 3/2605 342/371 |
| 7,161,540 B1 | 1/2007 | Liu | |
| 7,183,979 B1 | 2/2007 | Liu et al. | |
| 7,292,198 B2 | 11/2007 | Shtrom et al. | |
| 7,526,321 B2 | 4/2009 | Liu | |
| 7,567,213 B2 | 7/2009 | Liu | |
| 7,868,828 B2 | 1/2011 | Shi et al. | |
| 7,907,100 B2 | 3/2011 | Mortazawi et al. | |
| 2006/0182193 A1* | 8/2006 | Monsen | H04L 25/03057 375/267 |
| 2007/0257858 A1* | 11/2007 | Liu | H01Q 1/007 343/893 |

FOREIGN PATENT DOCUMENTS

| | | |
|---|---|---|
| TW | 201212383 A1 | 3/2012 |
| TW | 201330536 A1 | 7/2013 |
| TW | 201351910 A | 12/2013 |

* cited by examiner

WIRELESS NETWORK DEVICE AND WIRELESS NETWORK CONTROL METHOD

CROSS REFERENCE TO RELATED APPLICATIONS

This application claims priority of Taiwan Patent Application No. 103120667 filed on Jun. 16, 2014, the entirety of which is incorporated by reference herein.

BACKGROUND OF THE INVENTION

Field of the Invention

The disclosure generally relates to a network device, and more particularly, to a wireless network device and a wireless network control method for lobe interleaving.

Description of the Related Art

As portable electronic devices become more popular, there is a greater need for wireless network connection. The wireless network technologies currently in use include WiFi, WiMAX and 3GPP-LTE. For a wireless network device such as an access point (AP) or network user terminal, the antenna array plays an important role, since data is transmitted and received through the antenna array.

In current designs, a switching circuit is arranged in the antenna array for switching a plurality of antennas so that the wireless network device can switch and utilize different antennas to perform different operations. However, because the gain and the maximum effective anisotropy transmission power of the antenna are limited, and the sensitivity of signal reception by the antenna is also limited, as a result, the utilization efficiency of the wireless network device is affected. Therefore, a wireless network device and a wireless network control method are needed to improve the effective anisotropy transmission power, and the sensitivity of signal reception of the antenna, and then the utilization efficiency of the wireless network device will be promoted together.

BRIEF SUMMARY OF THE INVENTION

In order to solve the aforementioned problem, the invention proposes a wireless network device with lobe interleaving functions. By greatly increasing the lobes of different squint angles, the anisotropy, sensitivity and gain of the antenna can be improved, and the utilization efficiency of the wireless network device is improved.

In one aspect of the invention, the present invention provides a wireless network device including an antenna array and a lobe interleaver. The antenna array includes a plurality of antenna elements of different squint angles. The lobe interleaver is coupled to the antenna elements and has a plurality of output lobe ports. The lobe interleaver allocates and interleaves a radio signal of the antenna array with the same phase and the same power to generate a plurality of lobes of different squint angles, and the number of lobes is twice the number of antenna elements.

In another aspect of the invention, the present invention provides a wireless network control method which includes receiving a radio signal of an antenna array, wherein the antenna array comprises a plurality of antenna elements of different squint angles; and interleaving the radio signal of the antenna array with the same phase and the same power to generate a plurality of lobes of different squint angles. The wireless network control method further includes receiving and allocating the radio signal of an antenna into two first power signals by a power division unit; dividing one of the first power signals into two second power signals, and regarding another first power signal as a lobe, then output the lobe by the power division unit, in other words, the lobe is the allocated and interleaved radio signal; outputting one of the second power signals to a next-stage power division unit on the contrary of the power division unit by the power division unit; receiving a third power signal from a former-stage power division unit on the contrary of the power division unit by the power division unit; interleaving and outputting another second power signal and the third power signal to become another lobe, then output the lobe; and setting the number of lobes to twice the number of antenna elements.

In another aspect of the invention, the present invention provides a wireless network device including an antenna array and a power divider. The antenna array includes a plurality of antenna elements of different squint angles. The power divider is coupled to a first antenna element and a second antenna element of the plurality of antenna elements, allocates and interleaves a radio signal of the antenna array with the same phase and the same power to generate at least one middle lobe. A squint angle of the middle lobe is an average value of squint angles of the first antenna element and the second antenna element.

BRIEF DESCRIPTION OF DRAWINGS

The invention can be more fully understood by reading the subsequent detailed description and examples with references made to the accompanying drawings, wherein.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

In order to illustrate the purposes, features and advantages of the invention, the embodiments and figures of the invention are shown in detail as follows. This description is made for the purpose of illustrating the general principles of the invention and should not be taken in a limiting sense. It should be understood that the embodiments may be realized in software, hardware, firmware, or any combination thereof.

Figure 1A:
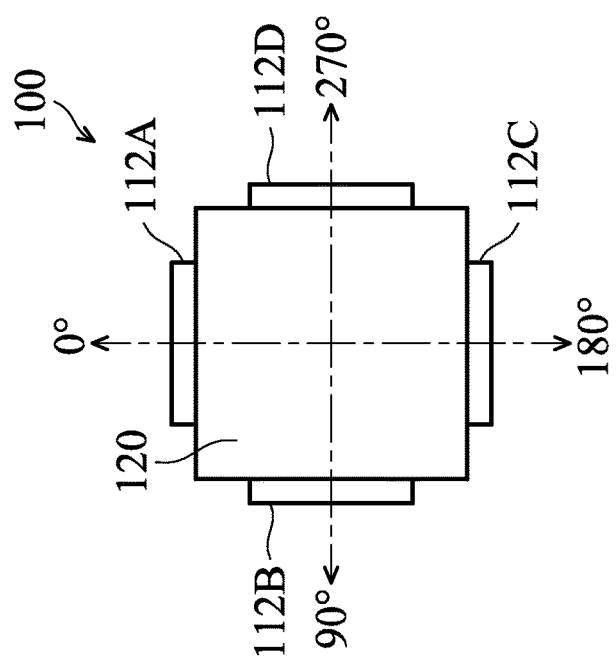
FIG. 1A is a top view of a wireless network device according to an embodiment of the invention.
Figure 1B:
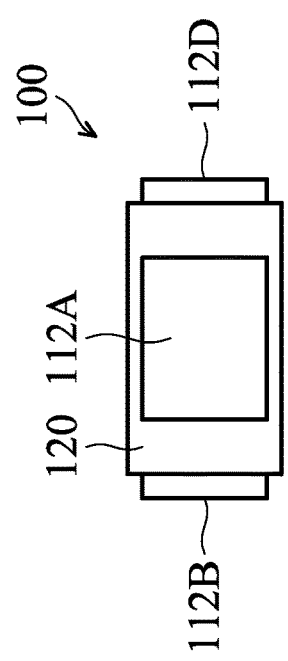
FIG. 1B is a side view of a wireless network device according to an embodiment of the invention.

FIG. 1A and FIG. 1B are a top view and a side view of a wireless network device 100 according to an embodiment of the invention. For example, the wireless network device 100 includes an access point, a bridge, a gateway, a switch, a client station, a server station or other types of stations. In order to reduce the interference between channels and increase the capacity of systems, the covering region of the wireless signal of the wireless network device 100 is usually divided into several sub-regions. The division of the covering region could be implemented by different types of antenna elements 112A~112D, such as sectored, quadrate, hexahedral and octahedral structures.

Figure 2A:
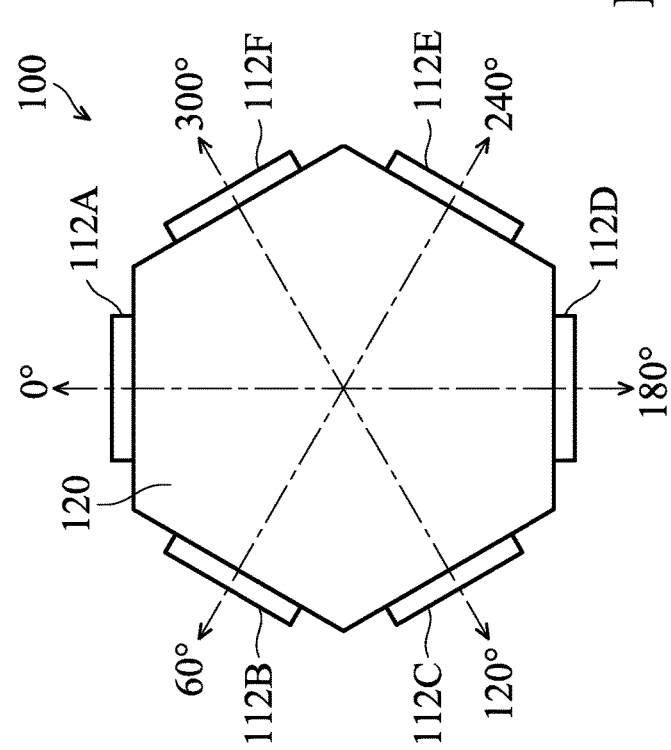
FIG. 2A is a top view of another wireless network device according to an embodiment of the invention.
Figure 2B:
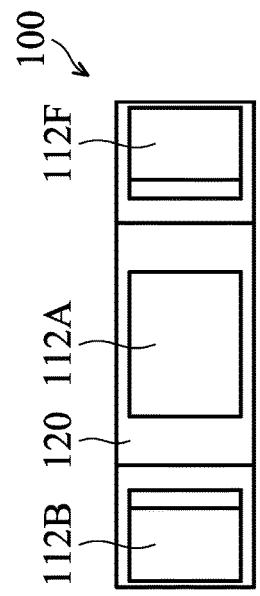
FIG. 2B is a side view of another wireless network device according to an embodiment of the invention.

For example, FIG. 1A and FIG. 1B illustrate quadrate antenna structures. The four antenna elements 112A, 112B, 112C and 112D surround the setting structure 120 at equal distances, which means that the four antenna elements 112A, 112B, 112C and 112D are arranged within a round angle (360°) equally and sequentially. In other words, for the central setting structure 120, the four antenna elements 112A, 112B, 112C and 112D have squint angles of 0°, 90°, 180° and 270° respectively. FIG. 2A and FIG. 2B are a top view and a side view of another wireless network device with hexahedral antenna structure according to an embodiment of the invention. In this embodiment, six antenna elements 112A, 112B, 112C, 112D, 112E and 112F are arranged within a round angle (360°) equally and sequentially and surround the setting structure 120 at equal distances. In other words, for the central setting structure 120, the six antenna elements 112A, 112B, 112C, 112D, 112E and 112F have squint angles of 0°, 60°, 120°, 180°, 240° and 300° respectively.

It should be noted that in order for the antenna elements 112A~112D to reach maximum array gain and/or maximum diversity gain, the polarization difference (co-polarized or cross-polarized), the squint angle (0° or 180°) and the space distance (smaller than half of wavelength, smaller than the wavelength or larger than the wavelength) between each pair of antenna elements could be adjusted. In one embodiment, the polarization of any two of the antenna elements 112A~112F could be orthogonal or non-orthogonal, and the space distance and the squint angles are irrelevant. In another embodiment, the space distance between any two adjacent antennas of the antenna elements 112A~112F is $\lambda/2$, and $\lambda$ means the wavelength of the radio wave which is transmitted or received by antenna elements 112A~112F.

Figure 3:
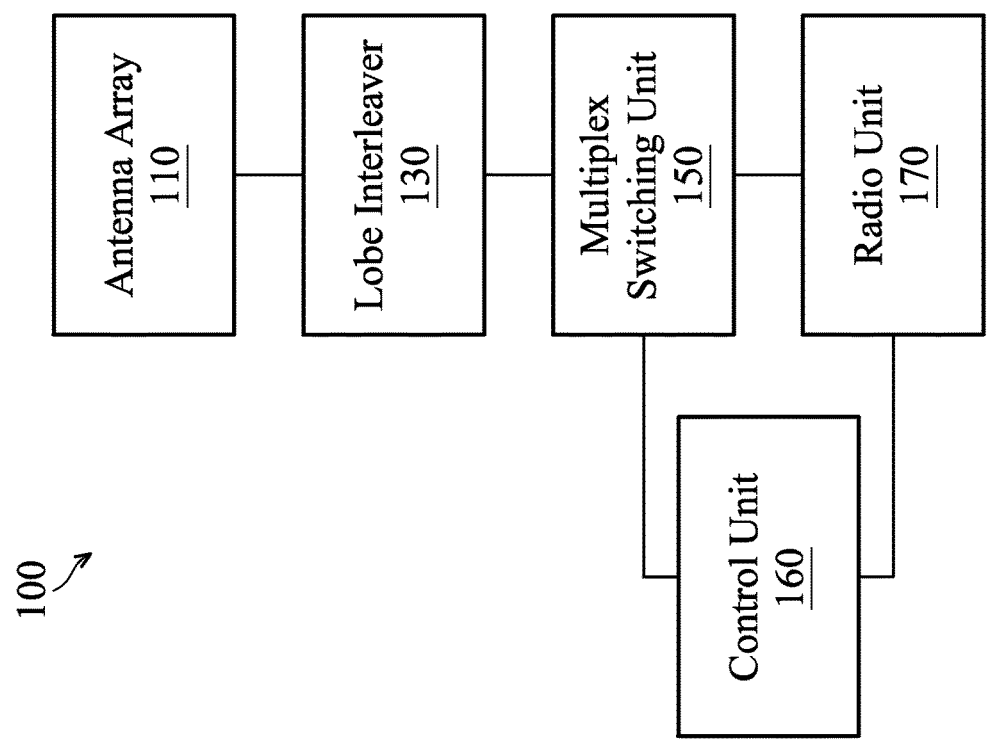
FIG. 3 is a schematic diagram of a wireless network device according to an embodiment of the invention.

FIG. 3 is a schematic diagram of a wireless network device 100 according to an embodiment of the invention. As shown in FIG. 3, the wireless network device 100 includes an antenna array 110, a lobe interleaver 130, a multiplex switching unit 150, a control unit 160 and a radio unit 170. In one embodiment, the antenna array 110 includes a plurality of antenna elements with different squint angles respectively. The lobe interleaver 130 is coupled to antenna elements and has a plurality of output lobe ports. Specifically, the lobe interleaver 130 distributes and interleaves the radio signal transmitted or received by the antenna array 110 with the same phase and the same power, and it generates a plurality of lobes. It should be noted that in addition to the lobes of the signals received by the original antenna elements, there are also interpolation lobes which are generated between antenna elements by the lobe interleaver 130. As such, the number of lobes above is twice the number of antenna elements.

In addition, the multiplex switching unit 150 is coupled to the lobe interleaver 130 to receive the above lobes, and it has a plurality of output radio ports. The radio unit 170 is coupled to the multiplex switching unit 150 and modulates and/or demodulates the radio signals. The control unit 160 is coupled between the multiplex switching unit 150 and the radio 170, and it controls the multiplex switching unit 150 for switching to at least one of the output lobe ports according to the intensity and/or quality of the wireless signal. It should be noted that the type of antenna array 110 includes the sectored, quadrate (as shown in FIG. 1A), hexahedral (as shown in FIG. 2A) and octahedral. The lobe interleaver 130 could include lobe output ports of different numbers for matching different kinds of the antenna array 110 and the multiplex switching unit 150 to construct the covering region of radio signals of the maximum 360°.

Figure 4A:
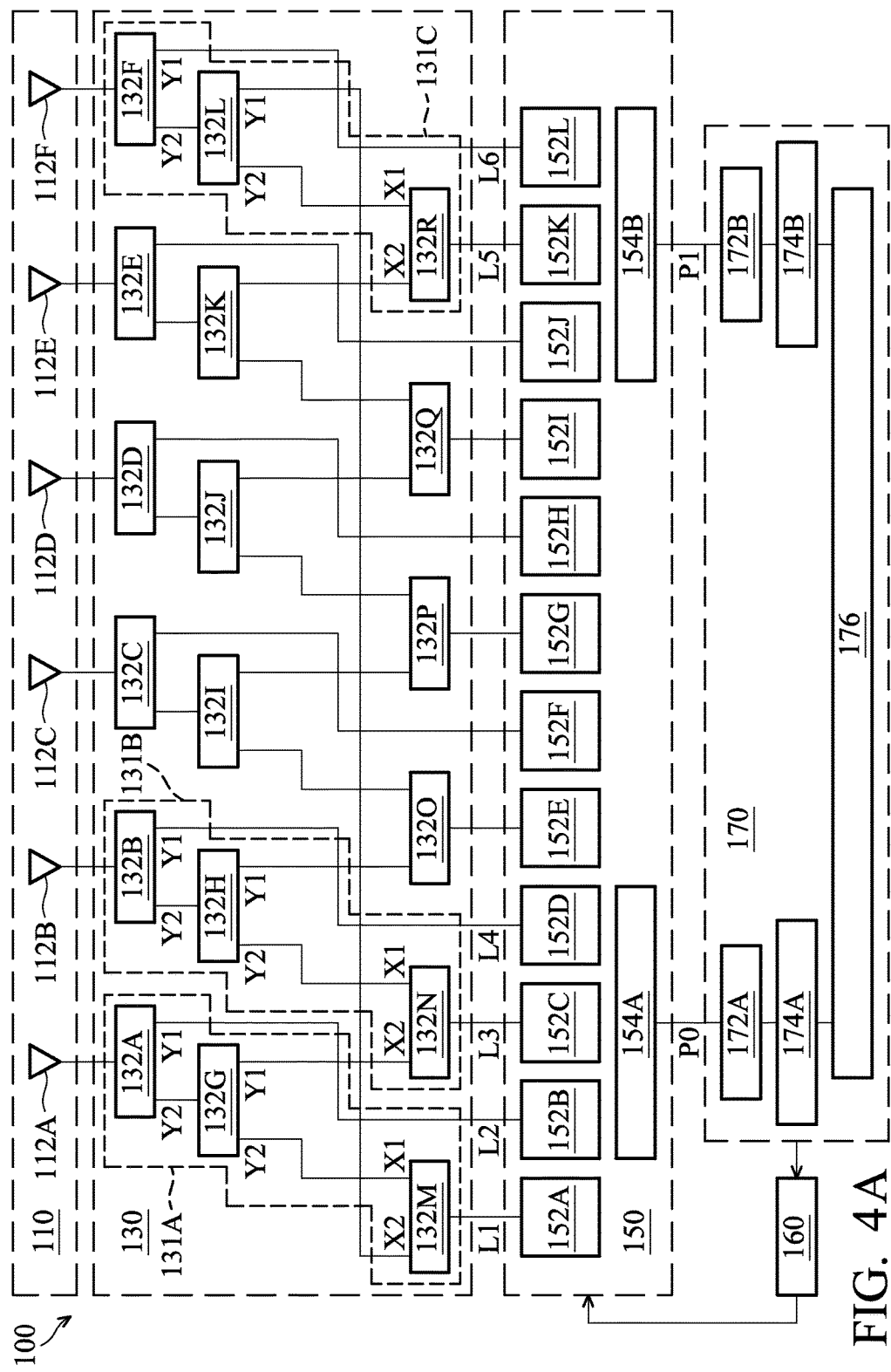
FIG. 4A is a schematic diagram of a wireless network device and its lobe interleaver according to an embodiment of the invention.
Figure 4B:
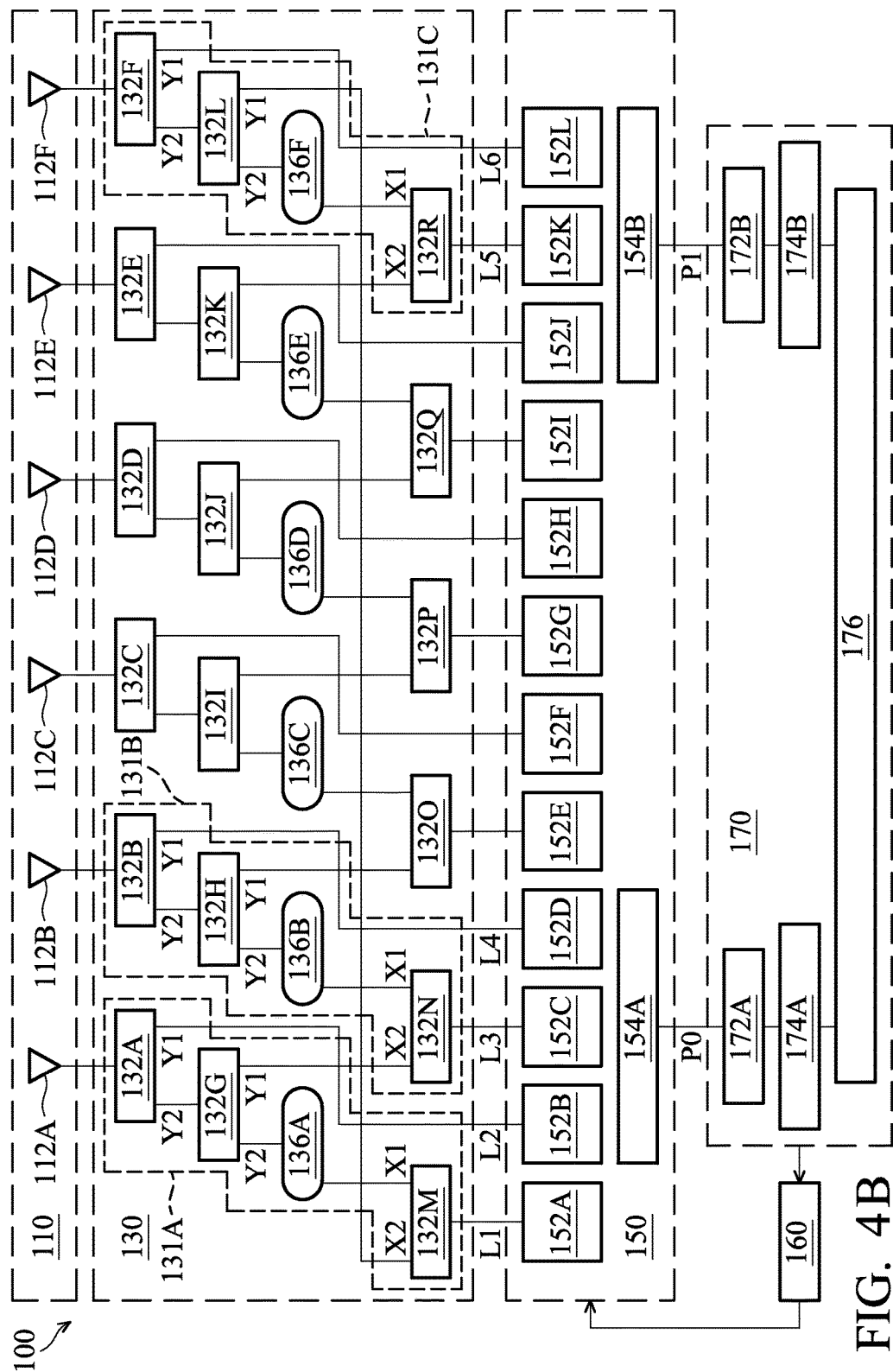
FIG. 4B is a schematic diagram of another wireless network device and its lobe interleaver according to an embodiment of the invention.

FIG. 4A and FIG. 4B are schematic diagrams of the wireless network device 100 and its lobe interleaver 130 according to an embodiment of the invention. In one embodiment, the antenna array 110 includes a plurality of antenna elements 112A~112F of different squint angles. For example, the antenna elements 112A~112F have squint angles of 0°, 60°, 120°, 180°, 240° and 300° respectively. The lobe interleaver 130 has a plurality of power dividers 132A~132R, and the number of power dividers 132A~132R is three times the number of antenna elements 112A~112F. For example, the antenna elements 110 has six antenna elements 112A~112F, and the lobe interleaver 130 has eighteen power dividers 132A~132R. In addition, in order not to limit the coupling bandwidth of the power dividers 132A~132R for power coupling, the power dividers 132A~132R could be T-junction splitters, inline splitters, Wilkinson splitters, branch line couplers, directional couplers, 90-degree hybrid couplers or magic-tee couplers. In order to reduce the insertion loss, the adapter, the phase shifter, the attenuator and/or the resistance matching circuit could be further arranged on the power dividers 132A~132R.

In one embodiment, as shown in FIG. 4A, the antenna array 110 includes a first antenna (such as the antenna 112A) and at least a second antenna (such as the antenna 112B) and a third antenna (such as the antenna 112F) corresponding to the first antenna. The lobe interleaver 130 includes a first power division unit 131A and at least one second power division unit 131B and a third power division unit 131C correspondingly. Specifically, the first power division unit 131A connects the first antenna to generate the first lobe L1 and the second lobe L2. The second power division unit 131B connects the second antenna to generate the third lobe L3 and the fourth lobe L4. The third power division unit 131C connects the third antenna to generate the fifth lobe L5 and the sixth lobe L6. It should be noted that each of the first power division unit 131A, the second power division unit 131B and the third power division unit 131C has a first power divider, a second power divider and a third power divider respectively. For example, the first power division unit 131A has a first power divider (power divider 132A), a second power divider (power divider 132G) and a third power divider (power divider 132M). The second power division unit 131B has a first power divider (power divider 132B), a second power divider (power divider 132H) and a third power divider (power divider 132N). The third power division unit 131C has a first power divider (power divider 132F), a second power divider (power divider 132L) and a third power divider (power divider 132R). In this embodiment, it is illustrated by six antennas and their corresponding six power division units. For the first antenna (such as the antenna element 112A), the corresponding next-stage antenna is the second antenna (such as the antenna element 112B), and the corresponding former-stage antenna is the third antenna (such as the antenna element 112F). It should be noted that the corresponding relationship between the antennas is not limited. If the antenna element 112C is the first antenna in an embodiment, the corresponding second antenna is the antenna element 112D, and the corresponding third antenna is the antenna element 112B. Accordingly, the operation and relation between each of the antennas will not be repeated again. In addition, in other embodiments, if there are only two antenna elements, when one of the antennas is the first antenna, the other antenna will be the second antenna. The second antenna is the next-stage antenna and the formal-stage antenna of the first antenna at the same time. In other words, the second antenna and the third antenna are implemented by the same antenna element in this embodiment.

For example, as shown in FIG. 4B, in another embodiment, three power dividers 132C, 132I and 132O and the phase adjuster 136C constitute the fourth power division unit (not shown). Three other power dividers 132D, 132J and 132P and the phase adjuster 136D constitute the fifth power division unit (not shown). Three other power dividers 132E, 132K and 132Q and the phase adjuster 136E constitute the sixth power division unit (not shown). In other words, for the six power division units, the power dividers 132A~132F are the first power divider, the power dividers 132G~132H are the second power divider, and the power dividers 132M~132R are the third power divider.

Specifically, in the first power division unit 131A, the first power divider 132A has a power input port connecting the first antenna, and has a first power output port Y1 for outputting the second lobe L2 to the second output lobe port of the output lobe ports. The second power divider 132G has a power input port connecting the second power output port Y2 of the first power divider 132A, and has a first power output port Y1 connecting the second power division unit 131B. The third power divider 132M has a first power input port X1 connecting a second power output port Y2 of the second power divider 132G, and has a second power input port X2 connecting the third power division unit 131C, and has a power output port for outputting the first lobe L1 to a first output lobe port of the output lobe ports. In addition, the first power output port Y1 of the second power divider 132G of the first power division unit 131A connects the second power input port X2 of the third power divider 132N of the second power division unit 131B. The second power input port X2 of the third power divider 132M of the first power division unit 131A connects the first power output port Y1 of the second power divider 132L of the third power division unit 131C.

Through the arrangement of the above power dividers, the squint angle of the first lobe L1 generated by the third power divider 132M of the first power division unit 131A is the average value of the squint angle of the first antenna 112A coupled by the first power division unit 131A and the squint angle of the third antenna 112F coupled by the third power division unit 131C. Similarly, the squint angle of the third lobe L3 generated by the third power divider 132N of the second power division unit 131B is the average value of the squint angle of the first antenna 112A coupled by the first power division unit 131A and the squint angle of the second antenna 112B coupled by the second power division unit 131B. As such, the lobes with different squint angles can be increased by the wireless network device of the present invention, and the anisotropy and gain of the antenna array 110 could be improved accordingly. In addition, the power division units such as the first power division unit 131A, the second power division unit 131B and the third power division unit 131C further include the phase trimmers 136A to 136F. Each of the phase trimmers 136A to 136F is coupled between the second power output port Y2 of the second power divider and the first power output port Y1 of the third power divider to adjust the phase of the second power divider and the third power divider. Therefore, the phase of each signal will not be biased during the process of power division.

In another embodiment, the antenna array 110 includes at least one first antenna (such as the antenna element 112A) and a second antenna (such as the antenna element 112B). The lobe interleaver 130 includes at least one first power divider (such as the power divider 132A and/or the power divider 132B) and at least one second power divider (such as the power divider 132G and/or the power divider 132H), and it generates at least a first lobe L1, a second lobe L2, a third lobe L3 and a fourth lobe L4. Specifically, the first power divider includes one power input port and two power output ports. The power input port of at least one first power divider connects to the first antenna and/or the second antenna (for example, the power divider 132A connects to the antenna element 112A, and the power divider 132B connects to the antenna element 112B). In addition, the first power output port of at least one first power divider connects to the power input port of at least one second power divider (for example, the power divider 132A connects to the power divider 132G, and the power divider 132B connects to the power divider 132H). The second power output port of at least one first power divider is utilized to output the second lobe and/or the fourth lobe (for example, the power divider 132A outputs the second lobe L2, the power divider 132B outputs the fourth lobe L4).

Specifically, the lobe interleaver 130 further includes at least one third power divider (such as the power divider 132M and/or the power divider 132N), and at least one third power divider includes two power input ports and one power output port. In one embodiment, the two power input ports of the third power divider respectively connect to two relatively adjacent power dividers among at least one second power divider (for example, the two power input ports of the power divider 132N respectively connect to the power divider 132G and the power divider 132H). In addition, the power output port of at least one third power divider outputs the first lobe L1 and/or the third lobe L3 respectively (for example, the power divider 132M outputs the first lobe L1, and the power divider 132N outputs the third lobe L3).

In one embodiment, the lobe interleaver 130 further includes at least one first phase trimmer (such as the phase trimmer 136A). The phase trimmer is coupled between the at least one second power divider and the at least one third power divider (for example, the phase trimmer 136A is coupled between the power divider 132G and the power divider 132M) to adjust or calibrate the phase of the at least one second power divider and the at least one third power divider. In another embodiment, the phase trimmer can be arranged between the at least one first power divider and the at least one second power divider to further adjust or calibrate the phase of more power dividers 132A~132R.

In the embodiment shown in FIG. 4A, the lobe interleaver 130 includes eighteen power dividers 132A~132R which include twelve power splitters 132A~132L and six power combiners 132M~132R. The number of power splitters is twice the number of power combiners. Specifically, the six power dividers 132A~132F (the first power divider) connect to the antenna elements 112A~112F respectively, and divide the radio signal of the antenna elements 112A~112F into two parts for outputting to the second power divider and the multiplex switching unit 150. The six power dividers 132G~132L (the second power divider) connect to the power dividers 132A~132F respectively, and divide the radio signal of the power dividers 132A~132F into two parts for outputting to the two adjacent third power dividers. Finally, one of the six power dividers 132M~132R (the third power divider) connects to every two adjacent power dividers of the power dividers 132G~132L, combines the radio signal of the two adjacent power dividers of the power dividers 132G~132L correspondingly, and outputs to the multiplex switching unit 150.

It should be noted that the power dividers 132A~132R distribute or combine the received radio signals with the same power and same phase. Through the arrangement of the above power dividers 132A~132R, the lobe interleaver 130 interleaves (including dividing and combining) the radio signals of the six antenna elements 112A~112F to generate twelve lobes. In this embodiment, the squint angles of the twelve lobes are 0°, 30°, 60°, 90°, 120°, 150°, 180°, 210°, 240°, 270° and 300°, and six squint angles of the lobes are the average values of the adjacent two elements 112A~112F. In other words, the width of each lobe is around 30°. For example, the squint angles of the antenna elements 112A and 112B are 0° and 60° for generating the second lobe L2 whose squint angle is 30°. As such, the number of lobes is twice the number of antenna elements 112A~112F, and the number of power dividers 132A~132R is three times the number of antenna elements 112A~112F. The space distance of the antenna elements 112A~112F is λ/2 for the double advantage of beam-forming and spatial-diversity. It should be noted that the arrangement of the antenna array 110 and the number of antenna elements could be increased, decreased or changed based on demand. The above illustration is for the embodiment of the present invention, not for limiting the present invention.

In another embodiment, the multiplex switching unit 150 includes twelve one-to-two switches (1P2T switches) 152A~152L and two one-to-twelve switches (1P12T switches) 154A~154B. The twelve 1P2T switches 152A~152L respectively receive the twelve lobes output by the lobe interleaver 130. In addition, the radio unit 170 includes two transmission switches (TR switch) 172A and 172B, two transceivers 174A and 174B, and a network processor 176. In another embodiment, the radio unit 170 further includes a low-noise amplifier, a power amplifier, and a base band processor/medium access control (MAC) and so on. The transmission switches 172A and 172B connect to the 1P12T switches 154A and 154B respectively to receive the two switching output signals P0 and P1 generated by the multiplex switching unit 150. Specifically, the multiplex switching unit 150 has twelve input ports and two output ports, and performs the multiplexing according to the instructions of the control unit 160 to select or switch two of the received twelve lobes and then output to the radio unit 170.

It should be noted that the number of antenna elements 112A~112F, power dividers 132A~132R, and 1P2T switches 152A~152L listed above are only for illustration and are not meant to limit the embodiments of the present invention. For example, in another embodiment, the antenna array 110 has N antenna elements, wherein N is an integer equal to or greater than two. The lobe interleaver 130 interleaves the radio signals of the N antenna elements to generate lobes wherein the number of the lobes is N multiplying M, and M is an integer equal to or greater than two. For example, if M equals two, the lobe interleaver 130 has 3N power dividers and generates 2N lobes. The lobe interleaver 130 has 3N power dividers and generates 2N lobes.

The multiplex switching unit 150 has 2N 1P2T switches to receive the 2N lobes. As such, the wireless network device 100 of the present invention generates 2N lobes by the N antenna elements. Since the lobes of different squint angles are greatly increased, the anisotropy, sensitivity and gain of the antenna array 110 can be improved, and the utilization efficiency of the wireless network device 100 and the transmission efficiency of the radio signal are also improved.

Accordingly, the multiplex switching unit 150 is utilized for allocating channels, connecting and switching several output ports of the lobe interleaver 130 to the radio unit 170 for optimizing the spectrum and the lobe pattern efficiency. As shown in FIG. 4B, the multiplex switching unit 150 is coupled to the lobe interleaver 130 having twelve output lobe ports. The lobe interleaver 130 is fed to the antenna array 110 of six antenna elements 112A~112F. The multiplex switching unit 150 is further coupled to the radio unit 170, and the control unit 160 connects between the multiplex switching unit 150 and the radio unit 170. The control unit 160 controls the multiplex switching unit 150, and develops the channel allocation and radio communication between the antenna array 110 and the radio unit 170 according to the intensity and/or quality of the radio signal.

Figure 5:
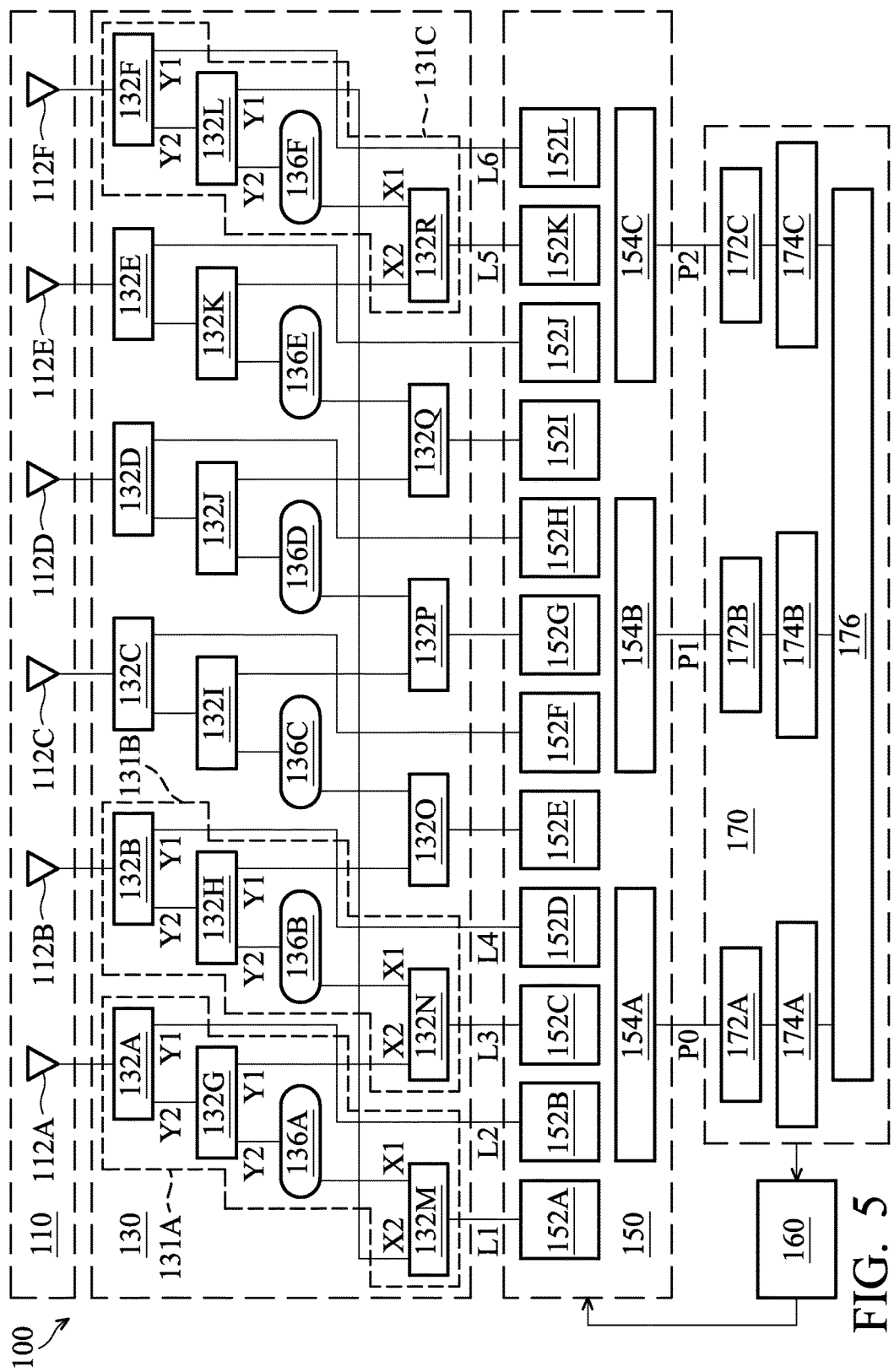
FIG. 5 is a schematic diagram of another wireless network device and its lobe interleaver according to an embodiment of the invention.

FIG. 5 is a schematic diagram of another wireless network device 100 and its lobe interleaver 130 according to an embodiment of the invention. The wireless network device 100 shown in FIG. 5 is similar to the wireless network device shown in FIG. 4B, but they differ in the arrangement of the multiplex switching unit 150 and the radio unit 170. As shown in FIG. 5, the multiplex switching unit 150 includes twelve one-to-three switches (1P3T switches) 156A~156L and three 1P12T switches 154A~154C. The twelve 1P3T switches receive the twelve lobes output by the lobe interleaver 130 respectively. In addition, the radio unit 170 includes three transmission switches 172A~172C, three transceivers 174A~174C and the network processor 176. The transmission switches 172A~172C connect to the 1P12T switches 154A~154C respectively to receive the three switch output signals P0, P1 and P2 generated by the multiplex switching unit 150. Specifically, the multiplex switching unit 150 has twelve input ports and three output ports and performs the multiplex switching according to the commands of the control unit 160. As such, three of the twelve received lobes are selected or switched for outputting to the radio unit 170.

Figure 6:
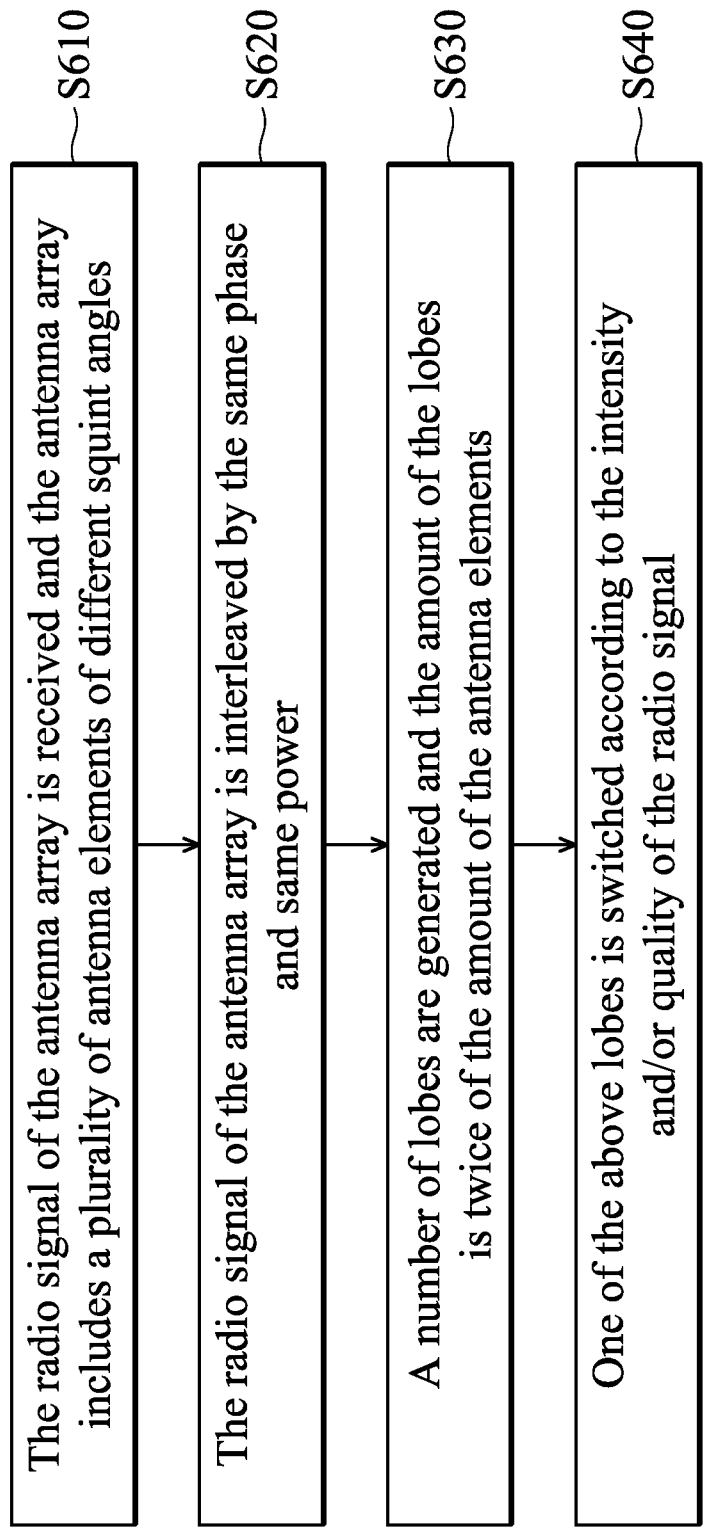
FIG. 6 is a flow chart of a wireless network control method according to an embodiment of the invention.

FIG. 6 is a flow chart of a wireless network control method according to an embodiment of the invention. In step S610, the radio signal of the antenna array 110 is received. The antenna array 110 includes a plurality of antenna elements 112A~112F of different squint angles. Afterwards, in step S620, the radio signal of the antenna array 110 is interleaved by the same phase and same power. Afterwards, in step S630, a number of lobes are generated. The number of lobes is twice the number of antenna elements 112A~112F. In step S640, one of the above lobes is switched according to the intensity and/or quality of the radio signal. Interleaving the radio signal of the antenna array with the same phase and same power is executed by a plurality of power dividers 132A~132R. The power divider divides the received antenna signal into two half-power signals (the first signal). One of the half-power signals is directly output to become the lobe of the antenna, and the other half-power signal is further divided by the power divider into two quarter-power signals (the second signal). One of the quarter-power signals is transmitted to the power divider corresponding to the relatively next-stage antenna for interleaving, and another quarter-power signal is combined with another quarter-power signal (the third signal) which is transmitted by the power divider of the relatively former-stage antenna for interleaving and generating an interpolation lobe. Details of the execution procedures and methods have been illustrated before and will not be repeated.

Through the wireless network device and the wireless network control method provided by the present invention, more lobes and diversity are generated for obtaining better gain and lobe quality and increasing the transmission efficiency of the radio signal. As such, the user can select suitable lobes among many lobes according to different environmental statuses and utilization types, and the utilization efficiency of the wireless network device 100 can be improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless network device, comprising:
   an antenna array, comprising a plurality of antenna elements with different squint angles; and
   a lobe interleaver, coupled to the antenna elements and having a plurality of output lobe ports, wherein the lobe interleaver allocates and interleaves a radio signal of the antenna array with same phase and same power to generate a plurality of lobes of different squint angles, and the number of lobes is twice the number of antenna elements.

2. The wireless network device as claimed in claim 1, wherein the squint angles of the antenna elements are distributed uniformly and sequentially in a round angle, and the squint angles of the lobes are distributed uniformly and sequentially in the round angle.

3. The wireless network device as claimed in claim 1, wherein the lobe interleaver has a plurality of power dividers, and the number of power dividers is three times the number of antenna elements.

4. The wireless network device as claimed in claim 1, wherein the antenna elements comprises a first antenna and at least one second antenna and a third antenna on the contrary of the first antenna, and the lobe interleaver comprises a first power division unit and at least one second power division unit and a third power division unit corresponding to the first power division unit, and the first power division unit connects to the first antenna to generate a first lobe and a second lobe of the lobes, and the second power division unit connects to the second antenna to generate a third lobe and a fourth lobe of the lobes, and the third power division unit connects to the third antenna to generate a fifth lobe and a sixth lobe of the lobes, and each one of the first power division unit, the second power division unit and the third power division unit has three power dividers comprising a first power divider, a second power divider and a third power divider.

5. The wireless network device as claimed in claim 4, wherein in the first power division unit:
   the first power divider has a power input port connected to the first antenna and a first power output port for outputting the second lobe to a second output lobe port of the output lobe ports;
   the second power divider has a power input port connected to a second power output port of the first power divider and a first power output port connected to the second power division unit; and
   the third power divider has a first power input port connected to a second power output port of the second power divider, a second power input port connected to the third power division unit, and a power output port for outputting the first lobe to a first output lobe port of the output lobe ports.

6. The wireless network device as claimed in claim 5, wherein the first power output port of the second power divider of the first power division unit connects to a second power input port of the third power divider of the second power division unit, and the second power input port of the third power divider of the first power division unit connects to a first power output port of the second power divider of the third power division unit.

7. The wireless network device as claimed in claim 6, wherein each of the first power division unit, the second power division unit and the third power division unit has a phase trimmer, and the phase trimmer is coupled between the second power output port of the second power divider and the first power input port of the third power divider in the first power division unit, the second power division unit and the third power division unit correspondingly.

8. The wireless network device as claimed in claim 1, further comprising:
   a multiplex switching unit, receiving the lobes by coupling the output lobe ports included by the lobe interleaver, and having a plurality of output radio ports; and
   a radio unit, coupled to the multiplex switching unit for modulating and/or demodulating the radio signal.

9. The wireless network device as claimed in claim 8, further comprising a control unit coupled between the multiplex switching unit and the radio unit for controlling the multiplex switching unit to switch to the at least one of the output lobe ports according to intensity and/or quality of the radio signal.

10. A wireless network control method, comprising:
   receiving a radio signal of an antenna array, wherein the antenna array comprises a plurality of antenna elements of different squint angles; and
   allocating and interleaving the radio signal of the antenna array with same phase and same power to generate a plurality of lobes of different squint angles, wherein the wireless network control method further comprises:
   receiving and allocating the radio signal of an antenna into two first power signals by a power division unit;
   dividing one of the first power signals into two second power signals, regarding another first power signal as a lobe, and outputting the lobe by the power division unit;
   outputting one of the second power signals to a next-stage power division unit on the contrary of the power division unit by the power division unit;

receiving a third power signal from a former-stage power division unit on the contrary of the power division unit by the power division unit;

interleaving another second power signal and the third power signal and outputting such interleaved result as another lobe; and setting the number of lobes to twice the number of antenna elements.

11. The wireless network control method as claimed in claim 10, further comprising: distributing the squint angles of the antenna elements uniformly and sequentially in a round angle, wherein the squint angles of the lobes are distributed uniformly and sequentially in the round angle.

12. The wireless network control method as claimed in claim 10, further comprising: allocating and interleaving the radio signal of the antenna array with same phase and same power by a plurality of power dividers of the power division unit, the next-stage power division unit and the former-stage power division unit, wherein the number of power dividers is three times the number of antenna elements.

13. The wireless network control method as claimed in claim 12, wherein the power divider comprises at least one power splitter and at least one power combiner, and the number of power splitters is twice the number of power combiners.

14. The wireless network control method as claimed in claim 10, further comprising switching the lobes by a multiplex switching unit to a radio unit according to intensity and/or quality of the radio signal.

15. A wireless network device, comprising:
an antenna array, comprising a plurality of antenna elements of different squint angles; and
a power divider, coupled to a first antenna and a second antenna of the plurality of antenna elements, and allocating and interleaving a radio signal of the antenna array with same phase and same power to generate at least one lobe, wherein a squint angle of the e lobe is an average value of squint angles of the first antenna and the second antenna.

16. The wireless network device as claimed in claim 15, wherein the number of lobes is twice the number of antenna elements, and the number of power dividers is three times the number of antenna elements.

* * * * *